United States Patent
Kato et al.

(10) Patent No.: US 7,162,085 B2
(45) Date of Patent: Jan. 9, 2007

(54) PATTERN RECOGNITION METHOD AND APPARATUS

(75) Inventors: Noriji Kato, Nakai-machi (JP); Hirotsugu Kashimura, Nakai-machi (JP); Hitoshi Ikeda, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 714 days.

(21) Appl. No.: 10/011,272

(22) Filed: Dec. 11, 2001

(65) Prior Publication Data
US 2002/0122593 A1    Sep. 5, 2002

(30) Foreign Application Priority Data
Dec. 22, 2000    (JP) ............................. 2000-390459

(51) Int. Cl.
G06K 9/00    (2006.01)
G06K 9/62    (2006.01)

(52) U.S. Cl. .................. 382/181; 382/224; 382/225; 382/226; 382/228

(58) Field of Classification Search ................. 382/224
See application file for complete search history.

(56) References Cited

FOREIGN PATENT DOCUMENTS

JP    A 2000-90274    3/2000

OTHER PUBLICATIONS

Perona. "Deformable Kernels for Early Vision." Proc. CVPR '91, IEEE Soc. Conf. on Computer Vision and Pattern Recognition, Jun. 3, 1991, pp. 222-227.*
Balachander et al. "Kernel Based Subspace Pattern Classification." IJCNN '99, Int. Joint Conf. on Neural Networks, vol. 5, Jul. 10, 1999, pp. 3119-3122.*
Kato et al. "An Analysis-Synthesis Loop Model Using Kernel Method." Proc. 2001 IEEE Signal Processing Society Workshop, Neural Networks for Signal Processing XI, Sep. 10, 2001, pp. 253-262.*
Sakano et al. "Kernel Mutual Subspace Method for Robust Facial Image Recognition." Proc. 4th Int. Conf. on Knowledge-Based Intelligent Engineering Systems and Allied Technologies vol. 1, Aug. 30, 2000, pp. 245-248.*
Coggins, J.M. "Non-linear feature space transformations", Applied Statistical Pattern Recognition, pp. 17/1-17/5, Apr. 1999.*
Maeda et al., "Multi-Category Classification by Kernel Based Nonlinear Subspace Method", IEEE, 1999, pp. 1025-1028.
Tsuda, "The subspace method in Hilbert space", vol. J82-D-II, No. 4, pp. 592-599, Apr. 1999 (w/ abstract).

* cited by examiner

Primary Examiner—Jingge Wu
Assistant Examiner—Brian Le
(74) Attorney, Agent, or Firm—Oliff & Berridge, PLC

(57) ABSTRACT

A pattern recognition method and apparatus decrease the amount of computation for pattern recognition and adapts flexibly to an increase and a change in learning samples. Learning is made beforehand on base vectors in a subspace of each category and a kernel function. Pattern data to be recognized is input, and projection of an input pattern to a nonlinear subspace of each category is decided. Based on the decided projection, a Euclidean distance or an evaluation value related to each category is calculated from the property of the kernel function, and is compared with a threshold value. If a category for which the evaluation value is below the threshold value exists, a category for which the evaluation value is the smallest is output as a recognition result. If there is no category for which the evaluation value is below the threshold value, a teaching signal is input for additional learning.

17 Claims, 5 Drawing Sheets

CATEGORY 1

CATEGORY 2

CATEGORY 3

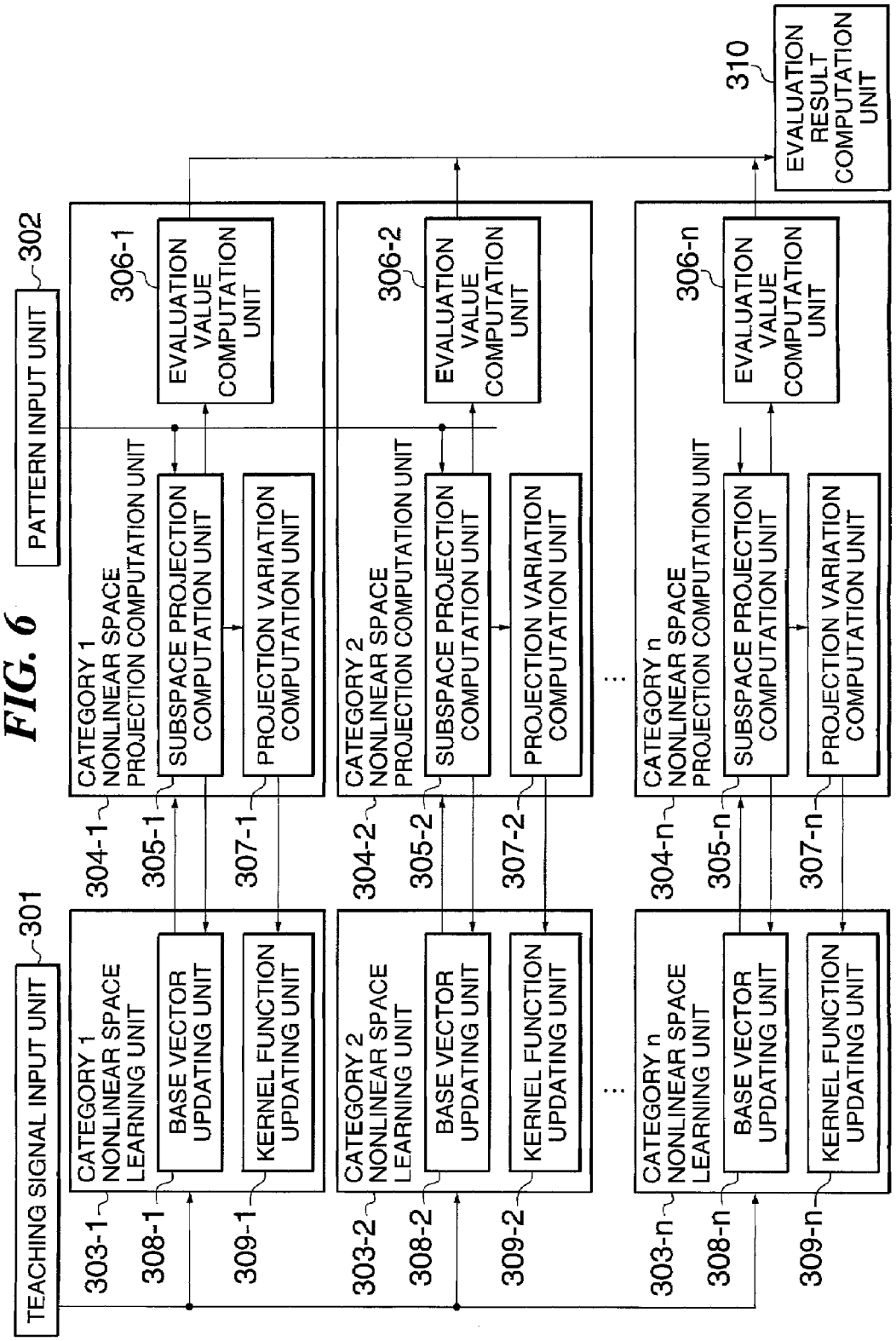

PATTERN RECOGNITION METHOD AND APPARATUS

BACKGROUND OF THE INVENTION

1. Field of the Invention

The present invention relates to a pattern recognition technique that uses a computer to judge to which of plural categories an input image and other data belong.

2. Description of the Related Art

Conventionally, pattern recognition methods by use of a computer have been proposed. For example, the following research is conducted. The image of a human face captured by an image sensor is analyzed to judge which portions of the image correspond to an eye, a nose, and other features, to categorize the portions/features and to determine to whose face the image corresponds by comparing the image with categorized images stored in advance.

A subspace method is well known as a pattern recognition method. According to the subspace method, a subspace is defined for each of plural categories, and by determining with which subspace an unknown pattern has the highest degree of relation, a category to which the unknown pattern belongs is determined. In the subspace method, where there are many categories, recognition accuracy becomes low, and it also becomes low for nonlinear pattern distributions.

Another well-known recognition method is the support vector machine (SVM) method. In the SVM method, by introducing a kernel function, low-dimension patterns are turned into high-dimension patterns, and nonlinear pattern distributions can also be recognized. However, the number of categories to which the method is applied is no more than two and an enormous amount of computation is required.

Recently, the kernel nonlinear subspace method has been proposed, which combines the advantages of the subspace method and the advantages of the SVM method (Japanese Published Unexamined Patent Application No. 2000-90274). In the kernel nonlinear subspace method, patterns to be recognized are mapped to a high-dimension nonlinear space using nonlinear conversion definable by a kernel function to create high-dimension patterns, as in the SVM method, and pattern recognition is performed by applying the subspace method on the high-dimension nonlinear space.

The kernel nonlinear subspace method, to define a subspace of a category "i" creates base vectors by linear combination of mappings of all learning samples to a nonlinear space. Herein, as a method of calculating an evaluation value for judging whether an unknown input pattern belongs to a category, a method is disclosed which utilizes projection components produced when a pattern to be recognized is projected to subspaces on a high-dimension liner space that correspond to categories. Since the subspaces are defined by linearly combining base vectors produced using learning samples, which are low-dimension vectors, the projection components to be obtained to recognize input patterns can be calculated simply by calculating the low-dimension vectors by use of a kernel function.

However, since the computation includes kernel operations between the pattern to be recognized and all learning samples, and inner product operations with the number of all learning sample as a dimension count, when the number of learning samples increases, the amount of computation would increase in proportion to the number of learning samples. Moreover, since all learning samples must be saved for kernel computation, there has been a problem in that a large storage area is required.

Since a learning process is performed by singular value decomposition of a kernel matrix with the results of kernel operations between learning samples as components, there is a problem in that, when a learning sample is newly added, learning must be performed again using existing learning samples to recalculate the weight of linear combination of base vectors constituting a subspace.

A kernel function must have been selected beforehand for recognition targets and cannot be adaptively changed depending on learning, posing the problem that recognition accuracy does not increase.

SUMMARY OF THE INVENTION

The present invention intends to provide a pattern technique that decreases the amount of computation for pattern recognition or can flexibly adapt to an increase and a change in learning samples.

According to one aspect of the present invention, a pattern recognition method includes: an evaluation value calculating step for using a set of vectors obtained by mapping a set of vectors conformed to at least one learning sample in an input space respectively to a nonlinear space defined by a kernel function as a set of base vectors constituting a subspace in the nonlinear space, defined for each of categories into which a pattern is classified, to calculate an evaluation value representative of a relation between the plural subspaces represented by linear combination of corresponding sets of the base vectors, and mapping of an unknown input pattern to the nonlinear space; and a category recognition step for recognizing a category to which the unknown input pattern belongs, based on the evaluation value.

In this configuration, vectors obtained by mapping vectors (hereinafter referred to as preimage vectors or preimages) conforming to learning samples in an input space to nonlinear spaces defined in kernel spaces are used as base vectors constituting the nonlinear spaces. Therefore, when calculating an evaluation value showing a relation between the unknown pattern and subspaces can be calculated using the preimage vectors, preventing the amount of computation from increasing because of an increase in the number of learning samples.

The term "conforming" also implies the meaning of "approximating" or "representing".

According to another aspect of the present invention, a method of learning base vectors constituting subspaces used for pattern recognition includes: a projection decision step that, for each mapping of a learning pattern to a nonlinear space defined by a kernel function, decides projection to a subspace that corresponds to a category into which the learning pattern is classified, and is represented by linear combination of a set of base vectors respectively created by a mapping of a set of vectors in an input space to the nonlinear space; and a vector updating step that updates the vectors in the input space in which the base vectors are created, to increase a relation between the mapping of the learning pattern obtained by the decided projection to the nonlinear space and the subspace corresponding to the category into which the learning pattern is classified.

In this configuration, the base vectors constituting the subspace can be updated according to a new learning pattern without having to hold previous learning patterns.

According to another aspect of the present invention, a method of deforming a kernel function includes the steps of: setting a kernel function for defining the mapping of a pattern in an input space to a nonlinear space which includes subspaces each defined for each of categories to which the pattern is classified; calculating a relation between the mapping of a learning pattern in the input space to the nonlinear space and the subspaces; and deforming the kernel function according to the result of the calculation of the relation.

In this configuration, variations in projection components to base vectors are calculated using a learning pattern, and a kernel function can be adaptively changed based on the calculation result.

The present invention can be implemented as a method, apparatus, or system, or can be implemented as a storage medium storing a program in at least a part thereof.

The above-described aspects and other aspects of the present invention will be described in claims and described below in detail using the accompanying drawings.

BRIEF DESCRIPTION OF THE DRAWINGS

Preferred embodiments of the present invention will be described in detail based on the followings, wherein:

FIG. 6 is a block diagram showing a variation of an embodiment of the present invention.

DESCRIPTION OF THE PREFERRED EMBODIMENTS

[Pattern Recognition]

Figure 1:
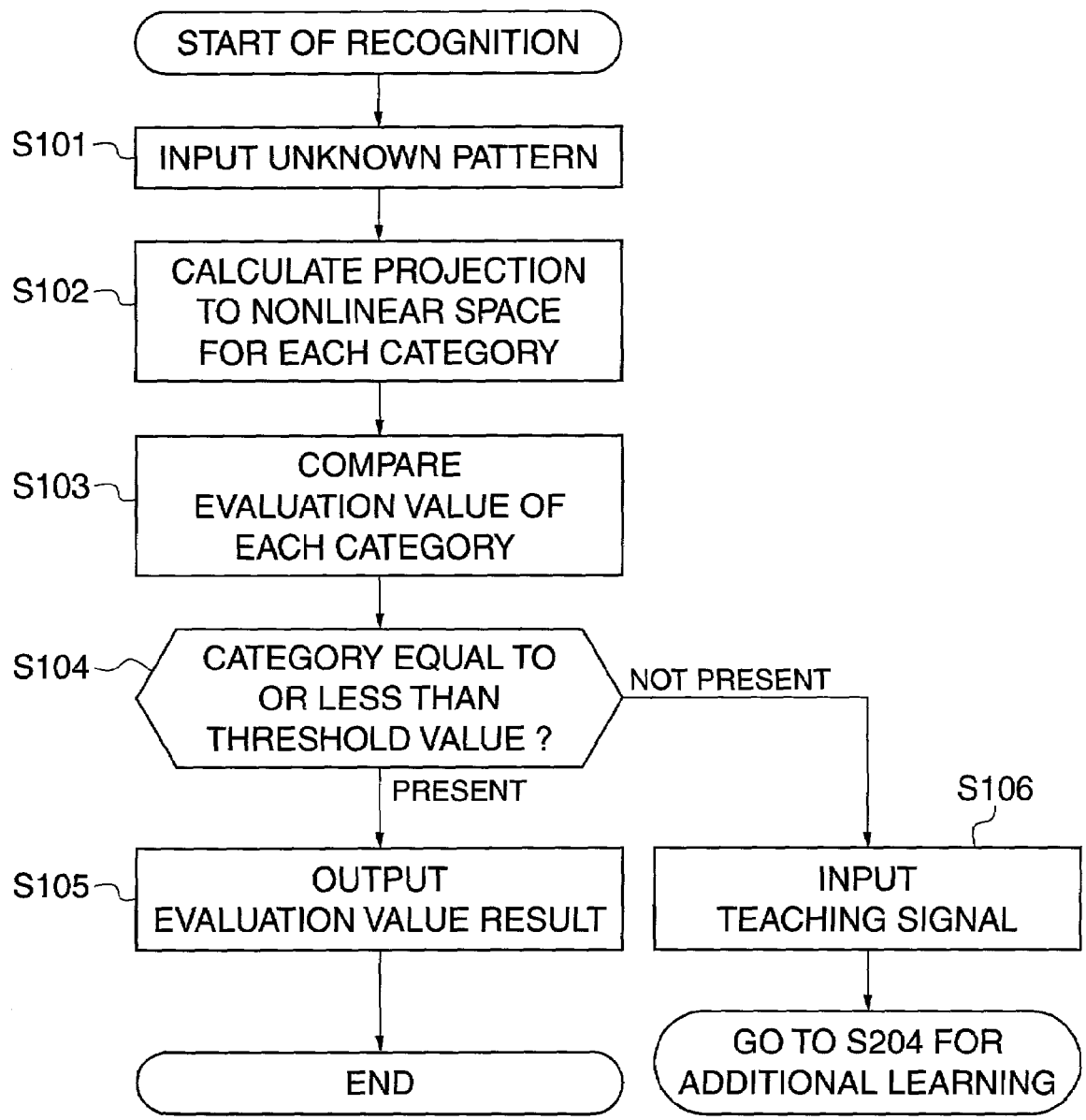
FIG. 1 is a flowchart of recognition processing in an embodiment of the present invention.

The principle of pattern recognition by the present invention will be described using a specific example. An arbitrary d-dimensional input pattern x and nonlinear conversion $\Phi$ that projects the input pattern x to a $d_\Phi$-dimensional high-dimension characteristic space are defined, and pattern recognition is performed in the $d_\Phi$-dimensional high-dimension characteristic space.

The mapping of the d-dimensional input pattern x by the nonlinear conversion $\Phi$ that is in relation with a kernel function $$K(x, y) = \sum_{i=1}^{d_\Phi} \lambda_i \phi_i(x) \phi_i(y) \quad (1)$$

with $$\phi_1(x), \ldots, \phi_{d_\Phi}(x)$$

as eigenfunctions is represented as $$x=(x_1, \ldots, x_d) \rightarrow \Phi(x)=(\sqrt{\lambda_1}\phi_1(x), \ldots, \sqrt{\lambda_{d_\Phi}}\phi_{d_\Phi}(x)) \quad (2)$$

using the kernel eigenfunctions, where $\lambda_i$ is an eigenvalue for an eigenfunction $\phi_i(x)$.

Next, for a subspace $\Omega$ of a high-dimension characteristic space represented by linear combination of nonlinear conversion images $\Phi(x_1), \ldots, \Phi(x_n)$ of n vectors $x_1, \ldots, x_n$ of d-dimension input space, a subspace of the high-dimension characteristic space is provided for a category to which the pattern belongs. The nonlinear conversion images $\Phi(x_1), \ldots, \Phi(x_n)$ are referred to as base vectors of the subspace $\Omega$, and n vectors $x_1, \ldots, x_n$ in an input space are referred to as preimages of the base vectors.

The preimages $x_1, \ldots, x_n$ are vectors that have been learned by a learning method described later, and have the characteristics of plural learning patterns, and each of the vectors is an approximation of plural learning patterns or is representative of plural learning patterns. The base vectors of the subspace $\Omega$ do not necessarily need to have an orthogonal relation with each other. The number of preimages, that is, the number n of base vectors of the subspace $\Omega$ is a preset parameter that influences recognition capability.

Projection of a nonlinear conversion image $\Phi(x)$ of the input pattern x to the subspace $\Phi$ is represented by a vector, $$\tilde{\Phi}(x)$$

which is the vector within the subspace Q with minimal Euclidean distance from the nonlinear conversion image $\Phi(x)$.

$$\tilde{\Phi}(x)$$

is decided by finding a coefficient $a_i$ which minimizes $$E = |\Phi(x) - \tilde{\Phi}(x)|^2 = \left|\Phi(x) - \sum_{i=1}^{n} a_i \Phi(x_i)\right|^2 \quad (3)$$

The expression (3) is represented as $$E = K(x, x) - 2\sum_{i=1}^{n} a_i K(x, x_i) + \sum_{i=1}^{n}\sum_{j=1}^{n} a_i a_j K(x_i, x_j) \quad (4)$$

using the property (1) expression of the kernel function. $a_i$ is obtained by serially changing it by a value obtained by the following expression from its initial value by the steepest descent method.

$$\Delta a_i = \xi \frac{\partial E}{\partial a_i} = 2\xi \left\{ K(x, x_i) - \sum_{j=1}^{n} a_j K(x_i, x_j) \right\} \quad (5)$$

$\xi$ is a small positive constant.

E obtained by assigning $a_i$ finally obtained to the expression (4) denotes the distance between the nonlinear conversion image $\Phi(x)$ of the input pattern x and the subspace $\Omega$. Specifically, E for a subspace corresponding to each category is computed, and it is judged that the input pattern belongs to the category where E is minimum.

The amount of computation depends on the number n of (preimage) vectors in an input space characterizing subspaces and the number d of dimensions, and will not increase in proportion to the number of learning samples. Since $K(x_i, x_j)$ in the expressions (4) and (5) is unchanged after learning is completed, it has to be computed only once. Learning samples do not need to be saved, contributing to reduction in storage capacity.

The amount of computation required for pattern recognition is very small because computation in a high dimensional non-linear space is not required. Since the steepest descent method also permits operations on base vectors in a subspace having no orthogonal relation with each other, it is particularly effective to changes of vectors (preimages) for creating base vectors constituting a subspace, as in the present invention.

[Preimage Learning]

Learning of preimage $x_i$ of a base vector in a subspace is performed as follows. Where, e.g., the steepest descent method is used for learning samples, $a_1, \ldots, a_n$ are computed using the expression (5). After the obtained $a_1, \ldots, a_n$ are assigned to the expression (3), a change of base vector $\Phi(x_i)$ is found as follows by the steepest descent method.

$$\Delta\Phi(x_i) = -\eta \frac{\partial E}{\partial \Phi(x_i)} = 2\eta a_i \left\{ \Phi(x) - \sum_{j=1}^{n} a_j \Phi(x_j) \right\} \quad (6)$$

A change of preimage $x_i$ corresponding to the change of $\Phi(x_1)$ is represented by $$\Delta x_i = \left( \frac{\partial \Phi(x_i)}{\partial x_i} \right)^{-1} \Delta \Phi(x_i) \quad (7)$$

where $$\frac{\partial \phi(x_i)}{\partial x_i}$$

is a matrix with $d_\Phi$ rows and d columns, and $$\left( \frac{\partial \phi(x_i)}{\partial x_i} \right)^{-1}$$

is an inverse matrix thereof. Generally, since the nonlinear mapping $\Phi$ is an n-to-1 mapping, an inverse matrix $$\left( \frac{\partial \phi(x_i)}{\partial x_i} \right)^{-1}$$

does not exist, but if the inverse matrix is approximated by a pseudo inverse matrix, $$\left( \frac{\partial \phi(x_i)}{\partial x_i} \right)^{-1} \cong \left( \frac{\partial \phi(x_i)^T}{\partial x_i} \frac{\partial \phi(x_i)}{\partial x_i} \right)^{-1} \left( \frac{\partial \phi(x_i)}{\partial x_i} \right)^T = (g_{ab}(x_i))^{-1} \left( \frac{\partial \phi(x_i)}{\partial x_i} \right)^T \quad (8)$$

is obtained, where a matrix $g_{ab}(x_i)$ with d rows and d columns is a metric tensor and represented as $$g_{ab}(x_i) = \frac{\partial}{\partial x_i^a} \frac{\partial}{\partial x_i'^b} K(x_i, x_i') \bigg|_{x_i = x_i'} \quad (9)$$

using a kernel function. If the expressions (6) and (8) are assigned to the expression (7), the following expression is obtained.

$$\Delta x_i = 2\eta a_i (g_{ab}(x_i))^{-1} \left\{ \frac{\partial}{\partial x_i} K(x, x_i) - \sum_{j=1}^{n} a_j \frac{\partial}{\partial x_i} K(x_i, x_j) \right\} \quad (10)$$

Learning is performed by serially updating preimage $x_i$ of base vector using the expression (10).

Since computation for the above learning is performed by updating preimages of base vectors, the amount of the computation is very small in comparison with conventional cases where all learning samples are required. Even in the case where learning samples are added after the learning is completed, since the learning may be performed for the added learning samples, additional learning is easy. The amount of computation for the above learning is very small because operations in a high dimensional non-linear space are not required.

[Updating Kernel Function]

A description will be made of a method of learning a kernel function. Before learning is started, well-known functions such as Gauss function kernels and polynominal kernels are set. During learning, a kernel function is deformed by a conformal mapping $$K(x, y) = C(x)C(y)K(x, y) \quad (11)$$

$C(x)$ is changed so that variations of coefficient $a_i$ for learning samples become uniform for any coefficient $a_i$. Specifically, where variations of coefficient $a_i$ are larger than a preset value, the value of $C(x)$ regarding the vicinity of preimage $x_i$ of a base vector of a subspace corresponding to the coefficient $a_i$ is increased. This enlarges a space in the vicinity of $x_i$ in a nonlinear characteristic space by $$\tilde{g}_{ab}(x) = \frac{\partial c(x)}{\partial x^a} \frac{\partial c(x)}{\partial x^b} + c(x)^2 g_{ab}(x) \quad (12)$$

Accordingly, the number of learning samples having coefficient $a_i$ of a large value decreases relatively, and variations for a learning sample of coefficient $a_i$ decrease. Conversely, where variations of coefficient $a_i$ are smaller than a preset value, the value of $C(x)$ regarding the vicinity of preimage $x_i$ of a base vector of a subspace corresponding to the coefficient $a_i$ is decreased.

$C(x)$ regarding preimage vicinity is increased or decreased by, e.g., an expression (14).

By a variation of a kernel function as described above, a kernel function adapted to learning samples is obtained, so that base vectors $\Phi(x_1)$ in a subspace represent an approximately equal number of learning samples. This increases recognition capability. As implied from the expression (10), smaller $g_{ab}(x)$ makes variations of coefficient $a_i$ smaller because changes of input space vector $x_i$ characterizing subspaces by learning are larger, that is, $x_i$ less responsive to learning samples speeds up learning. On the other hand, $x_i$ more responsive to learning samples makes changes of input space vector $x_i$ smaller and brings about a stable condition. This yields the effect of short-time learning period and excellent convergence.

Although the above method produces only the values of $C(x_i)$ in the vicinity of preimages, the values of $C(x)$ in other locations can be obtained through extrapolation from these values by the following expression $$C(x) = \frac{\sum_{i=1}^{n} a_i C(x_i)}{\sum_{i=1}^{n} a_i} \quad (13)$$

[Recognition Processing Procedure]

Next, a detailed procedure for pattern recognition processing according to the present invention will be described using a flowchart of FIG. 1. Assume that base vectors $\Phi(x_i)$ of a subspace of each category and a kernel function have been learned according to a procedure described later. In S101, pattern data to be recognized is input. The data is multidimensional data input from various sensors, such as image or sound data, or multidimensional pattern data obtained by converting the data. As learning patterns and unknown patterns, files stored on computer storage media and files obtained from networks can be used, and an interface with equipment for the files can be used as a pattern input device. In S102, projection $a_i$ to a nonlinear subspace of each category of an input pattern is calculated. To do this, $a_i$ is set to an initial value by, e.g., $$a_i = \frac{K(x, x_i)}{K(x_i, x_i)} \quad (14)$$

and serially updated by the expression (5). Each time $a_i$ is updated, an evaluation value E is calculated by the expression (4), and $a_i$ is updated until changes of E become below 1% or a predetermined number of times is reached. In S103, an evaluation value E calculated for each category is compared with a threshold value, and if, in S104, a category for which the evaluation value E is below the threshold value exists, control proceeds to S105. In S105, a category for which the evaluation value E is the smallest is output as a recognition result. If there is no category for which the evaluation value E is below the threshold value, recognition becomes unsuccessful and control proceeds to S106. In S106, a teaching signal indicative of a category of the input pattern is input. The teaching may be manually given or created analogically from other information. After the teaching signal is input, control proceeds to S204 in FIG. 2 for additional learning described later.

Using a flowchart of FIG. 2, a description will be made of a procedure for learning base vectors $\Phi(x_i)$ of a nonlinear subspace of each category and a kernel function in the present invention. The number of base vectors $\Phi(x_i)$ of a nonlinear subspace is specified beforehand. Initial value of base vectors $\Phi(x_i)$ is given by a random number. The kernel function is set beforehand to a known kernel such as a Gaussian kernel or polynominal kernel. In S201, a learning sample is input. The learning sample is the similar pattern data used in the recognition processing. In S202, the category to which the learning sample belongs is input as a teaching signal to select a nonlinear subspace of the category to be learned. In S203, projection $a_i$ of the learning pattern to the selected nonlinear subspace is calculated according to the procedure as in the recognition processing. In S204, the base vectors of the nonlinear subspace are updated according to the expression (10). In S205, the kernel function is deformed based on the expression (11). C(x) of the expression (11) is updated based on $$\tilde{C}(x) = \left(\frac{\sigma_{a_i}}{\sigma_{conv}}\right)^\alpha C(x) \quad (15)$$

so that variation $\sigma_{a_i}$ of projection $a_i$ to all learning samples converges to a given value $\sigma_{conv}$. $\alpha$ is a positive constant. $\sigma_{conv}$ may be set beforehand, or autonomously changed to an average value of $\sigma_{a_i}$ of each base. Since the above method gives C(x) only to preimages of bases of nonlinear subspace, C(x) for a given input x is obtained through extrapolation from the value of C(x) at preimage. The above learning continues until an evaluation value E for the learning sample becomes significantly small.

The additional learning may start from S204 because a teaching signal has been obtained the recognition processing in FIG. 1 and projection $a_i$ to a nonlinear subspace has been calculated.

Figure 3A:
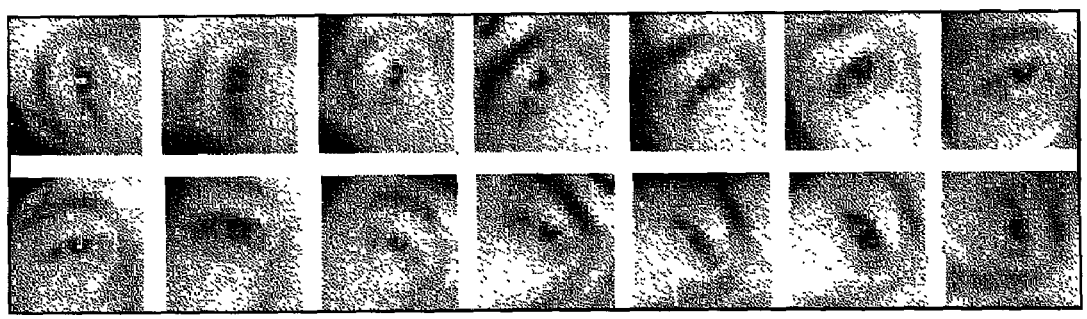
FIG. 3 is an example of a learning sample in an embodiment of the present invention.
Figure 3B:
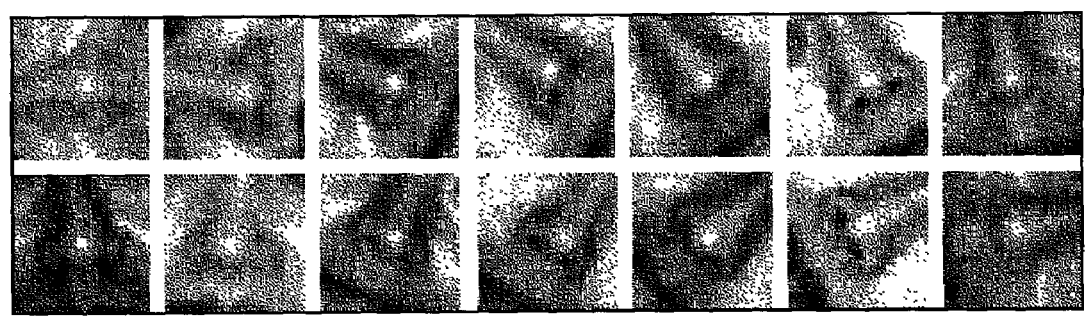
Figure 3C:
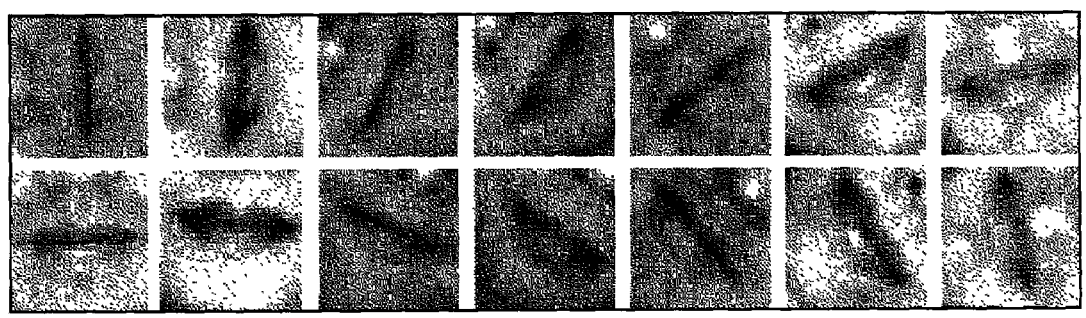
Figure 4:
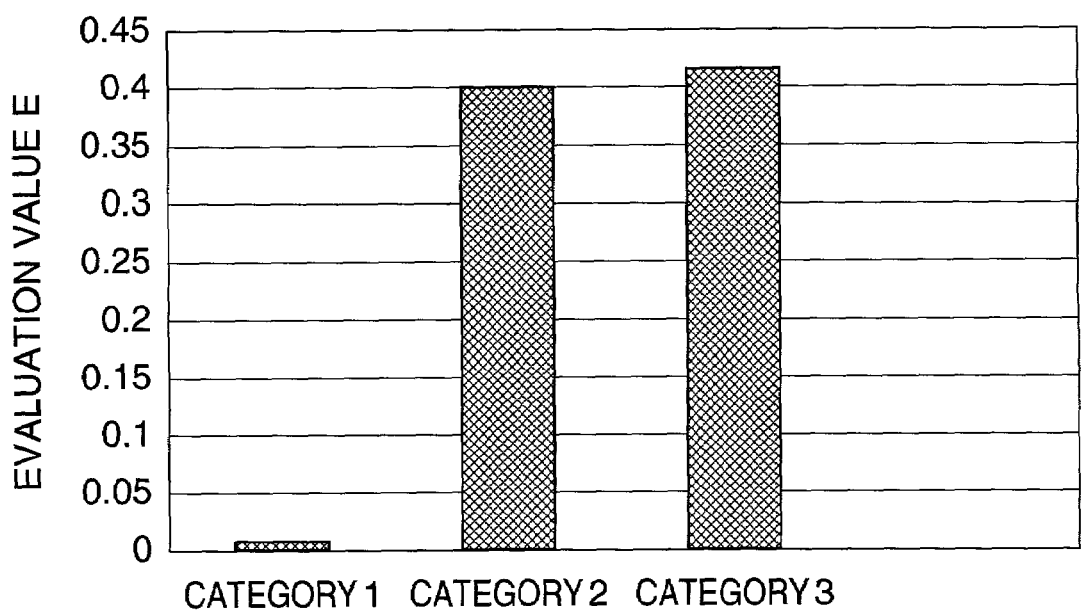
FIG. 4 is an example of recognition results in an embodiment of the present invention.
Figure 5:
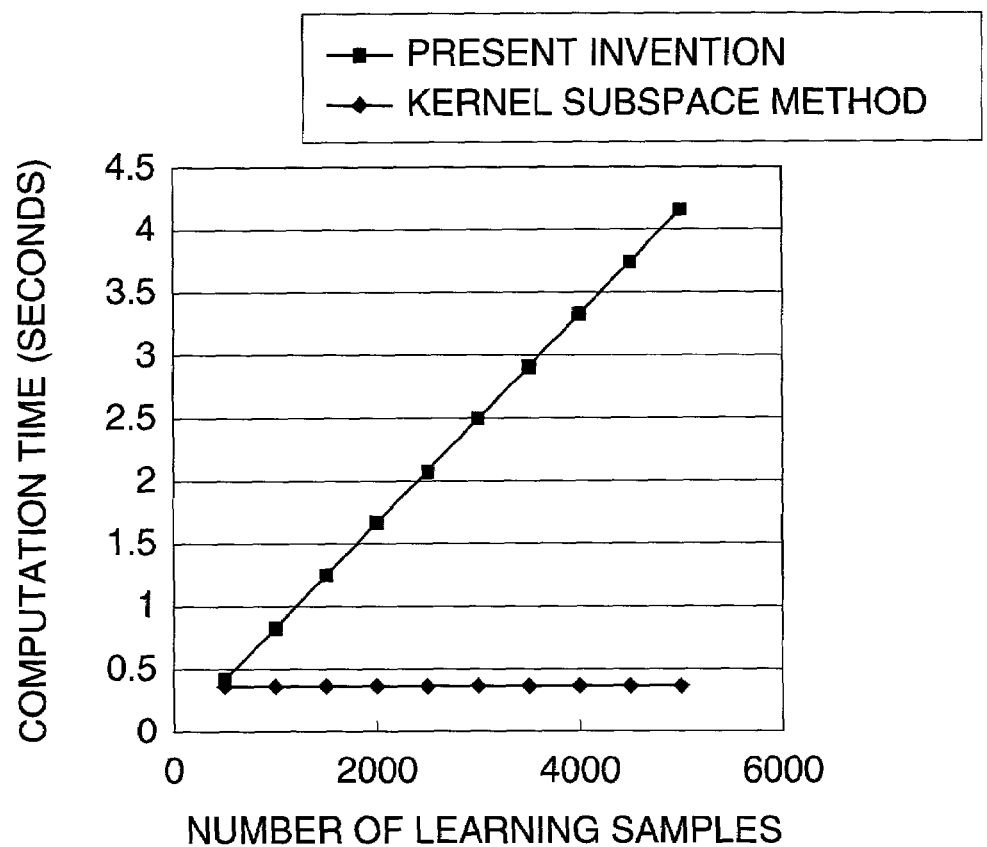
FIG. 5 illustrates comparison of computation time between an embodiment of the present invention and a conventional example.

FIG. 4 is a drawing showing a result of recognizing an image pattern by the present invention. An input pattern is an image of 27 by 27 pixels belonging to one of three categories shown in FIG. 3. FIG. 4 shows an evaluation value E for a nonlinear subspace in which learning was performed with learning samples of category 1. An evaluation value E for input of the category 1 is about one hundredth of evaluation values E for input of other categories, indicating that the pattern can be recognized. FIG. 5 shows computation time required for recognition processing by the present invention along with comparison with the conventional kernel nonlinear subspace method. The horizontal axis indicates the number of patterns used for learning and the vertical axis indicates computation time required for recognition processing. It will be understood that the present pattern recognition method enables recognition with computation time of about one hundredth in comparison with the conventional method.

FIG. 6 shows an example of configuring hardware so that parallel processing can be performed on a category basis to increase computation speed. A pattern input unit 301 inputs a pattern signal. A teaching signal input unit 302 inputs a teaching signal. For each category, nonlinear space learning units 303-1 to 303-n, and nonlinear projection computation units 304-1 to 304-n are provided. The nonlinear projection computation units 304-1 to 304-n are respectively provided with subspace projection computation units 305-1 to 305-n to which a pattern signal input from the pattern input unit 301 is input, and evaluation value computation unit 306-1 to 306-n to which projection computation results are input and which determine a relation with the category, and projection variation computation units 307-1 to 307-n to which projection computation results are input. The nonlinear space learning units 303-1 to 303-n are respectively provided with base vector updating units 308-1 to 308-n that update base vectors, based on the projection of the input learning pattern and a teaching signal, and kernel function updating units 309-1 to 309-n that update a kernel function according to the degree of projection variations. The base vector updating units 308-1 to 308-n have an internal storing part for storing, e.g., preimage data. Of course, the preimage data may also be stored in other storing units. The kernel function updating units 309-1 to 309-n also have an internal storing unit for storing data on a kernel function. Of course, the data on a kernel function may also be stored in other storing units. Evaluation results judged for each category are input to an evaluation result comparing unit 310, which determines to which category the input pattern belongs, and outputs the result.

Figure 2:
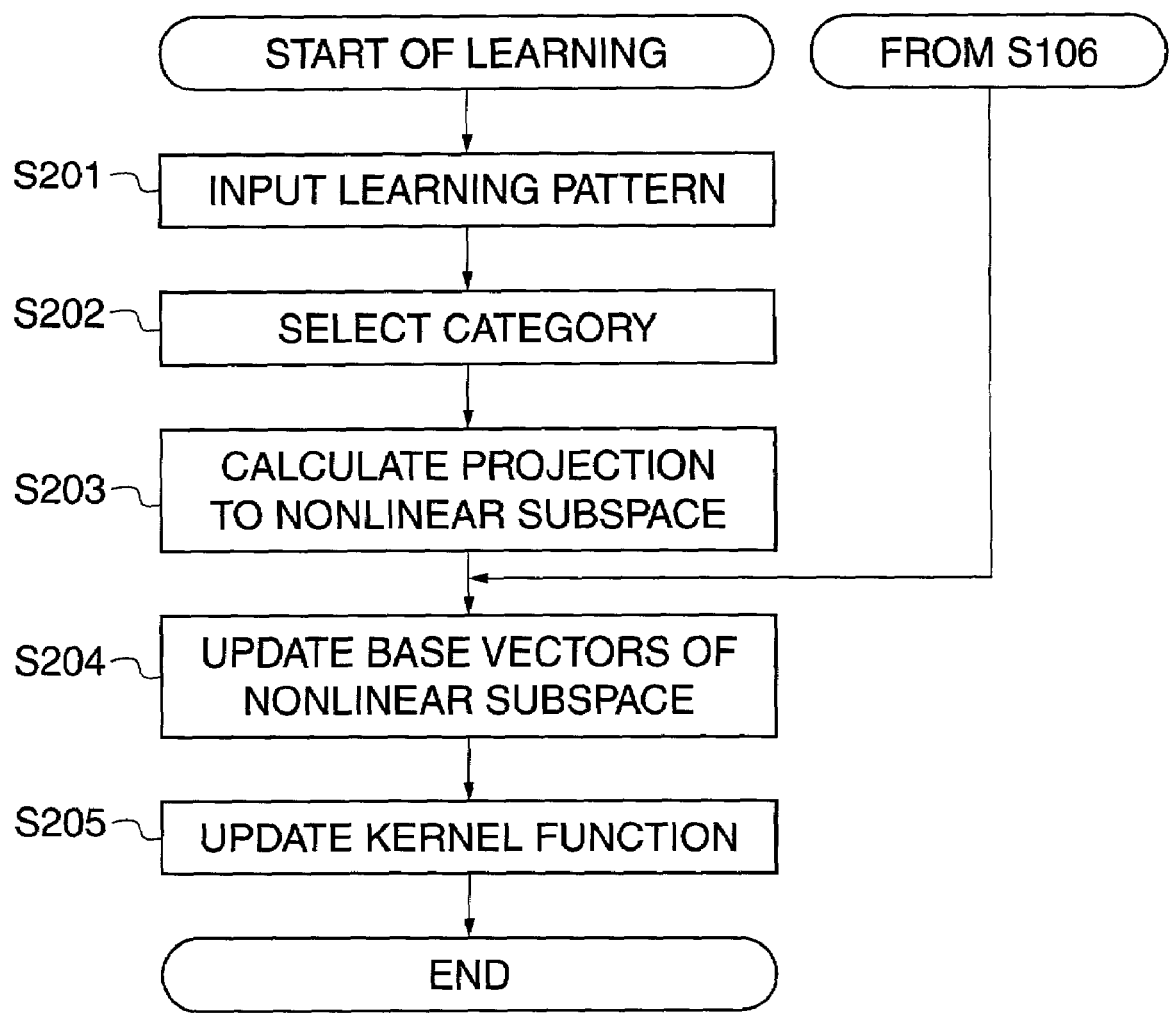
FIG. 2 is a flowchart of learning in an embodiment of the present invention.

It will be easily understood that this configuration also permits the same processing described using FIGS. 1 and 2 to be performed.

As has been described above, the present invention is provided as a computer program for executing the above-described algorithm, and also may be configured on dedicated hardware as described above.

As has been described above, according to a specific configuration of the present invention, not all learning samples need to be used to recognize complicated patterns, recognition is enabled with a small amount of computation, and a memory for storing learning samples is not required. Also, additional learning in which learning samples are newly added is easy. Moreover, a kernel function can be adaptively changed, offering the effects of increased recognition accuracy and speeding up learning.

As has been described above, the present invention can decrease the amount of computation for pattern recognition and adapt flexibly to an increase and change in learning samples.

The entire disclosure of Japanese Patent Application No. 2000-390459 filed on Dec. 22, 2001 including specification, claims, drawings and abstract is incorporated herein by reference in its entirety.

What is claimed is:

1. A pattern recognition method, comprising:
a step for calculating an evaluation value by using a set of vectors obtained by mapping a set of pre-image vectors conformed to plural learning samples in an input space respectively to a nonlinear space defined by a kernel function as a set of base vectors constituting each of plural subspaces in the nonlinear space, defined for each of plural categories into which a pattern is classified, and the pre-image vectors are obtained by a predetermined learning method before calculating the evaluation value so that the pre-image vectors approximate characteristics of the plural learning samples, the evaluation value representing a relation between the plural subspaces represented by a linear combination of corresponding sets of the base vectors and mapping of an unknown input pattern to the nonlinear space; and
a step for recognizing a category to which the unknown input pattern belongs, based on the evaluation value.

2. A pattern recognition method, comprising:
calculating an evaluation value by using a set of vectors obtained by mapping a set of pre-image vectors conformed to plural learning samples in an input space respectively to a nonlinear space defined by a kernel function as a set of base vectors constituting each of plural subspaces in the nonlinear space, defined for each of plural categories into which a pattern is classified, and the pre-image vectors are obtained by a predetermined learning method before calculating the evaluation value so that the pre-image vectors approximate characteristics of the plural learning samples, the evaluation value representing a relation between the plural subspaces represented by a linear combination of corresponding sets of the base vectors and mapping of an unknown input pattern to the nonlinear space; and
recognizing a category to which the unknown input pattern belongs, based on the evaluation value, wherein:
calculating the evaluation value includes:
obtaining projection of the mapping of the unknown input pattern to the nonlinear space to a subspace of each of the categories by making serial computations by a steepest descent method on a distance between the mapping of the input pattern to the nonlinear space and the subspaces; and
calculating the distance from the obtained projection, and recognizing a category includes:
determining that the input pattern belongs to a category where the distance from the subspace is minimum.

3. A pattern recognition method comprising:
a step for learning base vectors constituting subspaces used for pattern recognition, comprising:
a step for deciding, for each mapping of a learning pattern to a nonlinear space defined by a kernel function, projection to a subspace that corresponds to a category into which the learning pattern is classified, the subspace being represented by a linear combination of a set of base vectors created by a mapping of a set of vectors, respectively, in an input space to the nonlinear space; and
a step for updating the vectors in the input space in which the base vectors are created, and increasing a relation between the mapping of the learning pattern obtained by the decided projection to the nonlinear space and the subspace corresponding to the category into which the learning pattern is classified; and
a step for recognizing a category to which an unknown input pattern belongs, based on vectors updated in said learning step.

4. A pattern recognition method comprising:
learning base vectors constituting subspaces used for pattern recognition, comprising:
deciding, for each mapping of a learning pattern to a nonlinear space defined by a kernel function, projection to a subspace that corresponds to a category into which the learning pattern is classified, the subspace being represented by a linear combination of a set of base vectors created by a mapping of a set of vectors, respectively, in an input space to the nonlinear space; and
updating the vectors in the input space in which the base vectors are created, and increasing a relation between the mapping of the learning pattern obtained by the decided projection to the nonlinear space and the subspace corresponding to the category into which the learning pattern is classified; and
recognizing a category to which an unknown input pattern belongs, based on vectors updated in said learning,
wherein in learning base vectors constituting subspaces used for pattern recognition, a distance of a mapping of the learning pattern to the nonlinear space from the subspace is serially calculated by a steepest descent method to decide the projection, and the vectors are updated so as to decrease a distance between the mapping of the learning pattern obtained by the decided projection to the nonlinear space and the subspace corresponding to the category into which the learning pattern is classified.

5. A pattern recognition comprising:
deforming a kernel function, including:
setting a kernel function for defining a mapping of a pattern in an input space to a nonlinear space which comprises subspaces each defined for each of categories to which the pattern is classified;

calculating a relation between the mapping of a learning pattern in the input space to the nonlinear space and the subspaces; and deforming the kernel function according to the result of the calculation of the relation; and recognizing a category to which an unknown input pattern belongs, based on a kernel function deformed in said deforming.

6. The pattern recognition method according to claim 5, wherein in deforming the kernel function, the relation is calculated based on variations of projection components of the mapping of the learning pattern in the input space to the nonlinear space to base vectors of the subspaces, and the kernel function is deformed based on the calculation result and a predetermined threshold value.

7. The pattern recognition method according to claim 5, wherein deforming the kernel function comprises:

obtaining the base vectors by mapping a set of vectors conformed to at least one learning sample in an input space respectively to a nonlinear space by the kernel function;

obtaining a relation between the mapping of the learning pattern to the nonlinear space and the subspaces as variations of projection components of the mapping to the base vectors of the subspaces; and deforming the kernel function to increase a scale of the kernel function in the vicinity of the input space in which the base vectors are created, for base vectors large in variation, and to decrease the scale of the kernel function in the vicinity of the input space in which the base vectors are created, for base vectors small in variation.

8. The pattern recognition method according to claim 6, wherein in deforming the kernel function, a scale conversion is subjected to the function form of a pre-learning kernel function, based on the variations of projection components of the base vectors, to deform the kernel function.

9. A pattern recognition method comprising:

learning base vectors constituting subspaces used for pattern recognition, comprising:

deciding, for each mapping of a learning pattern to a nonlinear space defined by a kernel function, projection to a subspace that corresponds to a category into which the learning pattern is classified, the subspace being represented by a linear combination of a set of base vectors created by a mapping of a set of vectors, respectively, in an input space to the nonlinear space; and updating the vectors in the input space in which the base vectors are created, and increasing a relation between the mapping of the learning pattern obtained by the decided projection to the nonlinear space and the subspace corresponding to the category into which the learning pattern is classified; and recognizing a category to which an unknown input pattern belongs, based on vectors updated in said learning, wherein learning base vectors constituting subspaces used for pattern recognition further comprises:

obtaining a relation between the mapping of an input pattern to the nonlinear space and a subspace of each of the categories; and if relations between the mapping of the input pattern to the nonlinear space and all the subspaces are lower than a predetermined value, presenting a teaching signal indicative of a category to which the input pattern belongs and learning base vectors of a subspace corresponding to the category.

10. A pattern recognition method comprising:

learning base vectors constituting subspaces used for pattern recognition, comprising:

deciding, for each mapping of a learning pattern to a nonlinear space defined by a kernel function, projection to a subspace that corresponds to a category into which the learning pattern is classified, the subspace being represented by a linear combination of a set of base vectors created by a mapping of a set of vectors, respectively, in an input space to the nonlinear space; and updating the vectors in the input space in which the base vectors are created, and increasing a relation between the mapping of the learning pattern obtained by the decided projection to the nonlinear space and the subspace corresponding to the category into which the learning pattern is classified; and recognizing a category to which an unknown input pattern belongs, based on vectors updated in said learning, wherein learning base vectors constituting subspaces used for pattern recognition further comprises:

obtaining projection of the mapping of an input pattern to the nonlinear space to a subspace of each of the categories by making serial computations by the steepest descent method on a distance between the mapping of the input pattern to the nonlinear space and the subspaces; and if distances between the mapping of the input pattern to the nonlinear space and all the subspaces are larger than a desired value, presenting a teaching signal indicative of a category to which the input pattern belongs, and learning base vectors of a subspace corresponding to the category.

11. A storage medium readable by a computer, the storage medium storing a program of instructions executable by the computer to perform a function for pattern recognition, the function comprising:

a step for calculating an evaluation value by using a set of vectors obtained by mapping a set of pre-image vectors conformed to plural learning samples in an input space respectively to a nonlinear space defined by a kernel function as a set of base vectors constituting each of plural subspaces in the nonlinear space, defined for each of plural categories into which a pattern is classified, and the set of pre-image vectors are obtained by a predetermined learning method before calculating the evaluation value so that the pre-image vectors approximate characteristics of the plural learning samples, the evaluation value representing a relation between the plural subspaces represented by a linear combination of corresponding sets of the base vectors and mapping of an unknown input pattern to the nonlinear space; and a step for recognizing a category to which the unknown input pattern belongs, based on the evaluation value.

12. A pattern recognition apparatus, comprising:

means for inputting patterns;

means for calculating an evaluation value that uses a set of vectors obtained by mapping a set of pre-image vectors conformed to plural learning samples in an input space respectively to a nonlinear space defined by a kernel function as a set of base vectors constituting a subspace in the nonlinear space, defined for each of plural categories into which a pattern is classified, and the pre-image vectors are obtained by a predetermined learning method before calculating the evaluation value so that the pre-image vectors approximate characteristics of the plural learning samples, to calculate an evaluation value representative of a relation between the plural subspaces represented by a linear combination of corresponding sets of the base vectors, and mapping of an unknown input pattern to the nonlinear space; and means for recognizing a category to which the unknown input pattern belongs, based on the evaluation value.

13. The pattern recognition apparatus according to claim 12, further comprising:

a dedicated processing device that performs parallel processing for each of the categories.

14. The pattern recognition apparatus according to claim 12, further comprising:

a base vector updating part that decides projection of mapping of a learning pattern input from the input part to the nonlinear space to a subspace corresponding to a category into which the learning pattern is classified, and updates the base vectors to increase a relation between the mapping of the learning pattern obtained by the decided projection to the nonlinear space and the subspace corresponding to the category into which the learning pattern is classified.

15. A pattern recognition apparatus, comprising:

an input part that inputs patterns;

an evaluation value calculating part that uses a set of vectors obtained by mapping a set of pre-image vectors conformed to plural learning samples in an input space respectively to a nonlinear space defined by a kernel function as a set of base vectors constituting a subspace in the nonlinear space, defined for each of plural categories into which a pattern is classified, and the pre-image vectors are obtained by a predetermined learning method before calculating the evaluation value so that the pre-image vectors approximate characteristics of the plural learning samples, to calculate an evaluation value representative of a relation between the plural subspaces represented by a linear combination of corresponding sets of the base vectors, and mapping of an unknown input pattern to the nonlinear space;

a category recognition part that recognizes a category to which the unknown input pattern belongs, based on the evaluation value; and a vector updating part that decides projection of mapping of a learning pattern input from the input part to the nonlinear space to a subspace corresponding to a category into which the learning pattern is classified, by serial computations by a steepest descent method on a distance between the mapping of the learning pattern to the nonlinear space and the subspaces, and updates, by the steepest descent method, the vectors of the input space in which the base vectors are created, so as to decrease a distance between the mapping of the learning pattern to the nonlinear space obtained by the decided projection and the subspace corresponding to the category into which the learning pattern is classified.

16. A pattern recognition apparatus, comprising:

an input part that inputs patterns;

an evaluation value calculating part that uses a set of vectors obtained by mapping a set of pre-image vectors conformed to plural learning samples in an input space respectively to a nonlinear space defined by a kernel function as a set of base vectors constituting a subspace in the nonlinear space, defined for each of plural categories into which a pattern is classified, and the pre-image vectors are obtained by a predetermined learning method before calculating the evaluation value so that the pre-image vectors approximate characteristics of the plural learning samples, to calculate an evaluation value representative of a relation between the plural subspaces represented by a linear combination of corresponding sets of the base vectors, and mapping of an unknown input pattern to the nonlinear space;

a category recognition part that recognizes a category to which the unknown input pattern belongs, based on the evaluation value; and a kernel function deforming part that calculates a relation between mapping of at least one learning pattern in the input space to the nonlinear space and the subspaces by using the kernel function, and deforms the kernel function according to the result of calculation of the relation.

17. A pattern recognition apparatus, comprising:

an input part that inputs patterns;

an evaluation value calculating part that uses a set of vectors obtained by mapping a set of pre-image vectors conformed to plural learning samples in an input space respectively to a nonlinear space defined by a kernel function as a set of base vectors constituting a subspace in the nonlinear space, defined for each of plural categories into which a pattern is classified, and the pre-image vectors are obtained by a predetermined learning method before calculating the evaluation value so that the pre-image vectors approximate characteristics of the plural learning samples, to calculate an evaluation value representative of a relation between the plural subspaces represented by a linear combination of corresponding sets of the base vectors, and mapping of an unknown input pattern to the nonlinear space;

a category recognition part that recognizes a category to which the unknown input pattern belongs, based on the evaluation value; and a kernel function deforming part that calculates variations of projection components of mapping of at least one learning pattern in the input space to the nonlinear space to base vectors of the subspaces by the kernel function, and deforms the kernel function so that the calculation of the variations results in a predetermined value.

* * * * *